（12）United States Patent
Åström et al.

(10) Patent No.: US 10,489,899 B2
(45) Date of Patent: Nov. 26, 2019

(54) METHOD AND ARRANGEMENTS FOR IDENTIFYING A PIXEL AS A LOCAL EXTREME POINT

(71) Applicant: SICK IVP AB, Linköping (SE)

(72) Inventors: Anders Åström, Linköping (SE); Robert Forchheimer, Linköping (SE); Mattias Johannesson, Linköping (SE)

(73) Assignee: SICK IVP AB, Linkoping (SE)

( * ) Notice: Subject to any disclaimer, the term of this patent is extended or adjusted under 35 U.S.C. 154(b) by 56 days.

(21) Appl. No.: 15/852,159

(22) Filed: Dec. 22, 2017

(65) Prior Publication Data
US 2018/0218488 A1 Aug. 2, 2018

(30) Foreign Application Priority Data
Jan. 27, 2017 (EP) .................................... 17153606

(51) Int. Cl.
H04N 5/378 (2011.01)
G06T 7/00 (2017.01)

(52) U.S. Cl.
CPC ............ *G06T 7/0002* (2013.01); *H04N 5/378* (2013.01)

(58) Field of Classification Search
CPC ..................................................... H04N 5/378
USPC ...................................................... 348/222.1
See application file for complete search history.

(56) References Cited

U.S. PATENT DOCUMENTS 5,883,971 A * 3/1999 Bolle ................ G06K 9/00067
382/115
2017/0280079 A1* 9/2017 Fu ......................... G06F 1/3234

FOREIGN PATENT DOCUMENTS

WO 2013/107525 A1 7/2013

OTHER PUBLICATIONS

Astrom et al., "Global Feature Extraction Operations for Near-Sensor Image Processing", IEEE Transactions on Image Processing, vol. 5, No. 1, Jan. 1996, pp. 102-110.
Eklund et al., "VLSI Implementation of a Focal Plane Image Processor—A Realization of the Near-Sensor Image Processing Concept", IEEE Transactions on Very Large Scale Integration (VLSI), vol. 4, No. 3, Sep. 1996, pp. 322-335 (cited in specification on p. 5).

(Continued)

Primary Examiner — Joel W Fosselman
(74) Attorney, Agent, or Firm — Renner, Otto, Boisselle & Sklar, LLP

(57) ABSTRACT

Method and an imaging and processing circuit for identifying a certain pixel as a local extreme point. The imaging and processing circuit generates, in a certain sensing element associated with said certain pixel and in two or more of its closest neighboring sensing elements, sensed signal levels, respectively, based on sensed light during an exposure to light. It provides, based on comparisons between said sensed signal levels and at least two different threshold levels, binarized image data of said certain sensing element and said two or more of its closest neighboring sensing elements. The imaging and processing circuit then identifies, by means of a computing element configured to operate on the provided binarized image data, said certain pixel as the local extreme point based on that the provided binarized image data of said certain sensing element differ from the provided binarized image data of said two or more of its closest neighboring sensing elements.

15 Claims, 5 Drawing Sheets

(56) References Cited

OTHER PUBLICATIONS

Gamal et al., "Trends in CMOS Image Sensor Technology and Design", International Electron Devices Meeting Digest of Technical Papers, 2002, pp. 805-808 (cited in specification on p. 5).
Guilvard et al., "A Digital High Dynamic Range CMOS Image Sensor with Multi-Integration and Pixel Readout Request", SPIE-IS&T Electronic Imaging, vol. 6501, 2007, pp. 65010L-1 to 65010L-10 (cited in specification on p. 5).
Zhang et al., "A Programmable Vision Chip Based on Multiple Levels of Parallel Processors", IEEE Journal of Solid-State Circuits, vol. 46, No. 9, Sep. 2011, pp. 2132-2147.

\* cited by examiner

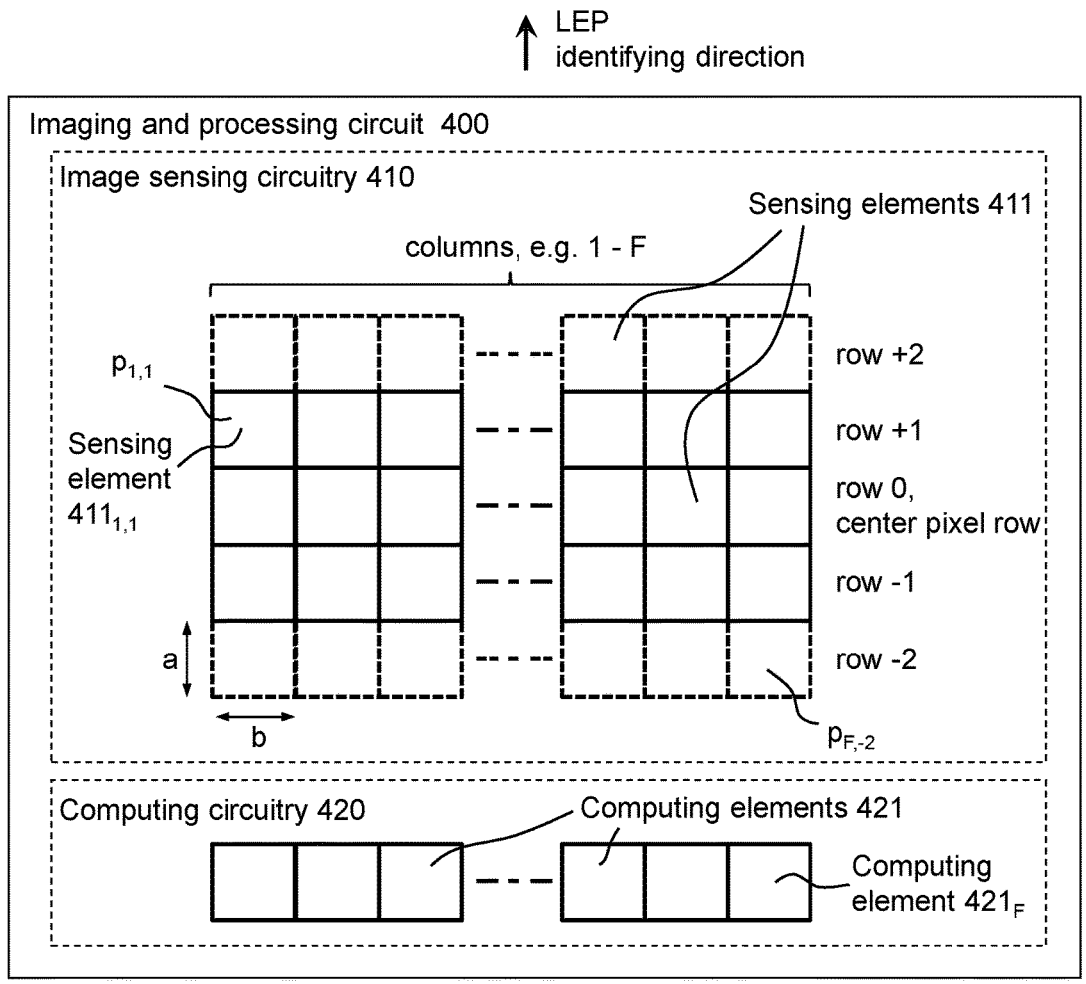
FIG 4a
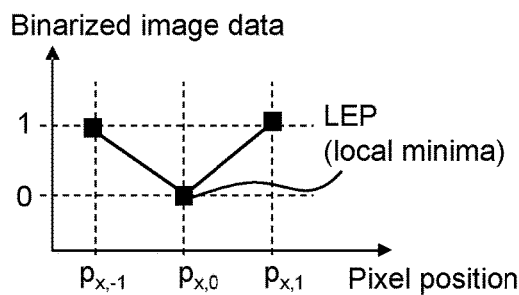 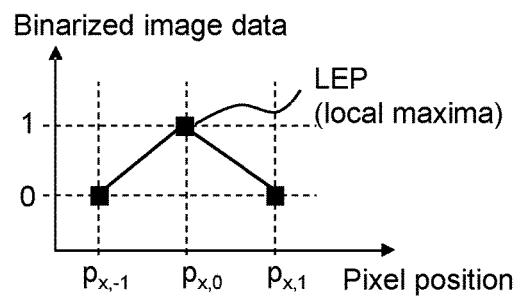
FIG 4b        FIG 4c

METHOD AND ARRANGEMENTS FOR IDENTIFYING A PIXEL AS A LOCAL EXTREME POINT

TECHNICAL FIELD

Embodiments herein relate to an imaging and processing circuit, based on a Near Sensor Image Processing (NSIP) architecture, for identifying a pixel as a local extreme point.

BACKGROUND

A Local Extreme Point (LEP) is present in a pixel position when an image data value of the pixel position is a maxima or minima in relation to image data values of at least two pixel positions that are closest neighbors to said pixel position. There can be different reasons for wanting to identify a pixel as a LEP, i.e. to determine or decide that a pixel is a LEP. For example, an algorithm regarding Time-to-impact (TTI) estimation, see e.g. WO 2013/107525, is based on identification of LEPs. TTI aims at estimating the time when a possible collision may occur between a camera and an object seen by the camera when these are relatively moving towards, or away from, each other, the camera imaging the object by a sequence of images when it relatively approaches or moves away from the camera. The solution underlying said patented TTI estimation algorithm is based on an algorithm that estimates the "inverse" of the motion, i.e. how long an image feature stays at the same pixel position. The algorithm is based on identifying LEPs for this purpose. Owing to that operations could be independently performed on pixel positions and that the LEPs relate to very local data, computations could be made in parallel and implementation of the TTI algorithm were therefore well suited to be implemented on hardware architectures for parallel computing, for example Single Instruction Multiple Data (SIMD) type of processors. In particular implementations were well used for parallel architectures with processing capacity directly on or in close connection with images sensing circuitry, or even in close connection with single sensing elements. For example, the inventors could show that their LEP based approach with the TTI estimation algorithm drastically reduced computational load and also lend itself naturally to be implemented using a Near-Sensor Image Processing (NSIP) architecture, e.g. on an NSIP type of processor, which enables very cost efficient implementation and low power consumption.

NSIP is a concept described for the first time about 30 years ago, in which an optical sensor array and a specific low-level processing unit were tightly integrated into a hybrid analog-digital device. Despite its low overall complexity, numerous image processing operations can still be performed at high speed competing favorably with state-of-art solutions.

FIG. 1 is a schematic block diagram of an architecture of the first commercial implementation of the NSIP concept, the LAPP1100 chip. It comprises 128 processor slices, one per pixel. Beside the light sensing circuitry, each slice contains a tiny arithmetic unit and 14 bits of storage. Image data can be read-out from a shift register but also tested for the occurrences of one or more set bits (Global-OR) or the total number of set bits (COUNT) within the 128 bit line image. There is no Analog to Digital (A/D) converter on board. Instead, if A/D conversion is part of an application based on the LAPP1100 it can be implemented in software using one of several different principles. One is based on utilizing the approximately linear discharge that each CMOS photo diode exhibited during exposure to light. A selected number of registers together with an arithmetic unit may then be used to implement parallel counters that, for each pixel stopped counting when the photo diode reached a predefined level. However, A/D conversion is often not necessary. Many tasks, such as filtering for certain features or performing adaptive thresholding may just as easily be done by utilizing a pixel readout circuit of the chip in combination with a small bit processor available at each pixel. Experiences related to the LAPP1100 have been summarized and published under the name of NSIP.

FIG. 2 schematically shows basic light sensing parts a-f of the LAPP1100 for providing image data of a pixel. The capacitor b represents an inherent capacitance of the photo diode c. When the switch a is on, the diode pre-charges to its full value. As the switch is turned-off and the photo diode discharge due to photo-induced current, the voltage on the input of the comparator d decreases. At some level, this voltage passes a reference voltage e and an output f switches its logical value corresponding to image data of the pixel. The output, i.e. the image data that is a bit value, may then be processed in the bit-serial arithmetic-logical unit g. The light sensing parts a-f may be considered to correspond to a light sensing element or pixel readout circuit, and the bit-serial arithmetic-logical unit g may be considered to correspond to a computing element that also may be named a pixel processor or bit processor. Many tasks, such as filtering for certain features, histogramming or doing adaptive thresholding can be performed by utilizing the pixel readout circuit in combination with the bit processor available for each pixel. The output from the pixel readout can be referred to as binarized image data when it represents information that the image intensity is above or below the threshold. However, the duration from pre-charge to output switching includes full, or at least more, information of the image intensity, which can be utilized by the processor for A/D conversion or other intensity-related operations. The concept naturally gives a high dynamic range as well as a very high frame rate.

When explaining the processor part of the NSIP architecture it may be convenient to view it as a single processor with a word length that is equal to the number of pixels in its sensor part. The main part of the processor is the register file containing register words of the size of said word length. A second register is the accumulator. Later implementations of NSIP also contain other and/or additional registers to enhance certain types of processing. A first class of simple operations is "point operations" such as AND, OR etc. They typically apply between a register and the accumulator, modifying the accumulator to hold the new result. A second class of typically very useful operations is the "local operations" by a Neighborhood Logical Unit (NLU) in which a 3-element template may be applied simultaneously over a register to form a low-level filtering operation. A 1-dimensional example of such an operation is an operation "(01x) R1" which compares the template (01x) against each position in the word and generates a logical 1 where the template fits and a logical 0 otherwise. This particular template checks that the bit position itself has the value 1 while its left neighbor is 0 and the right neighbor is allowed to be either 1 or 0, i.e. "don't care". This local operator may e.g. be useful when it comes to finding edges in an intensity image and also for finding local extreme points.

A third class of operations is "global operations". These are used for many different purposes such as to find the leftmost or rightmost 1 in a register or to zero all bits from a certain position or to set a group of consecutive zero bits.

The global operations are all derived from the mark operation which uses two input registers as operands. Set bits in the first register are viewed as pointers to objects in the second register. Objects are connected sets of 1's. Objects which are pointed to, will be kept and forwarded to the result.

With the above-mentioned operations at hand, one can implement most of typical low-level image processing tasks. Instructions are issued one at a time from an external or chip-internal sequencer or microprocessor over e.g. a 16 bit bus. Processed images can e.g. be read-out over the same bus or a dedicated I/O channel. However, most often it is sufficient to compute some specific scalar value such as the position of an image feature, the highest intensity value, a first order moment etc. For this reason, an NSIP architecture often contains a count status, COUNT, which is configured to always reflect the number of set bits in the accumulator as well as a global-OR which indicates if one or more bits in the accumulator is set. Thanks to such status information, applications based on NSIP often do not need to read out complete conventional images from the chip, thus speeding up the applications considerably. As an example the sum of all values f(i), each e.g represented by b bits in the processors may be found using only b COUNT operations and appropriate scaling and summing of the COUNT results.

When implementing embodiments herein on the NSIP architecture introduced above, LEPs are extracted from image data. One of the simplest operations to extract a LEP is to find local minima in a 3×1 neighborhood. This means that if a center pixel has a lower intensity compared to both its neighbors, then this pixel is a LEP. As recognized, finding such local minima can be accomplished using a basic NSIP NLU-operation but can also be done using other sequential operations. Also thanks to the NSIP concept explained above, there will be a high dynamic range which facilitate finding local minimum values in both bright and dark regions.

The following disclosures are example of some further implementations based on the NSIP concept.

Eklund J-E, Svensson C, and Aström A, "Implementation of a Focal Plane Processor. A realization of the Near-Sensor Image Processing Concept" IEEE Trans. VLSI Systems, 4, (1996).

El Gamal A., "Trends in CMOS Image Sensor Technology and Design," International Electron Devices Meeting Digest of Technical Papers, pp. 805-808 (2002).

Guilvard A., et al., "A Digital High Dynamic Range CMOS Image Sensor with Multi-Integration and Pixel Readout Request", in Proc. of SPIE-IS&T Electronic Imaging, 6501, (2007).

FIG. 3, is a diagram from a simulation just to illustrate LEPs in an image and for better understanding of LEPs. A row from a standard image has been taken and the LEPs have been marked. The LEPs have been identified in a local 3×1 neighborhood and correspond to local minima in this case. An NSIP operation to find the LEPs may be defined as (101) which means that if a center pixel has not passed its threshold but its two closest, i.e. nearest, neighbors have both passed the threshold, then the center pixel is a LEP that correspond to a local minimum point. In the figure, part of the image has been magnified to better illustrate the LEPs, indicated at black dots. Each row from the image used in the shown figure consisted of 512 pixels and in the shown particular case there are about 70 LEPs along an selected row.

SUMMARY

In view of the above, an object is to provide one or more improvements relating to identifying a pixel as a Local Extreme Point (LEP) using a Near Sensor Image Processing (NSIP) based architecture.

According to a first aspect of embodiments herein, the object is achieved by a method, performed by a an imaging and processing circuit, for identifying a certain pixel as a local extreme point, i.e. LEP. The imaging and processing circuit comprises multiple computing elements and multiple sensing elements. The sensing elements are configured to sense light and in response provide binarized image data of pixels, respectively. The computing elements are configured to operate on binarized image data from different subsets, respectively, of said sensing elements, where each subset comprises a sensing element and at least two closest neighboring sensing elements thereof. The imaging and processing circuit generates, in a certain sensing element associated with said certain pixel and in two or more of its closest neighboring sensing elements, sensed signal levels, respectively, based on sensed light during an exposure to light. The imaging and processing circuit then provides, based on comparisons between said sensed signal levels and at least two different threshold levels, binarized image data of said certain sensing element and said two or more of its closest neighboring sensing elements. Further, the imaging and processing circuit identifies, by means of a computing element configured to operate on the provided binarized image data, said certain pixel as the LEP. The identification is based on that the provided binarized image data of said certain sensing element differ from the provided binarized image data of said two or more of its closest neighboring sensing elements. The difference indicates that there is a local maxima or minima in said certain pixel.

According to a second aspect of embodiments herein, the object is achieved by a computer program comprising instructions that when executed by an imaging and processing circuit causes the an imaging and processing circuit to perform the method according to the first aspect.

According to a third aspect of embodiments herein, the object is achieved by a computer readable medium comprising the computer program according to the second aspect.

According to a fourth aspect of embodiments herein, the object is achieved by an imaging and processing circuit for identifying a certain pixel as a LEP. The imaging and processing circuit comprises multiple computing elements and multiple sensing elements. The sensing elements are configured to sense light and in response provide binarized image data of pixels, respectively. The computing elements are configured to operate on binarized image data from different subsets, respectively, of said sensing elements, where each subset comprises a sensing element and at least two closest neighboring sensing elements thereof. The imaging and processing circuit is configured to generate, in a certain sensing element associated with said certain pixel and in two or more of its closest neighboring sensing elements, sensed signal levels, respectively, based on sensed light during an exposure to light. The imaging and processing circuit is configured to provide, based on comparisons between said sensed signal levels and at least two different threshold levels, binarized image data of said certain sensing element and said two or more of its closest neighboring sensing elements. The imaging and processing circuit is configured to identify, by means of a computing element configured to operate on the provided binarized image data, said certain pixel as the LEP. The identification is based on that the provided binarized image data of said certain sensing element differ from the provided binarized image data of said two or more of its closest neighboring sensing elements. The difference indicates that there is a local maxima or minima in said certain pixel that thus is the local extreme point.

Embodiments herein is about identifying a pixel as a LEP, using an NSIP based architecture, and relate to using two or more threshold levels when providing binarized image data that the identification is based on. Different ways of utilizing two or more threshold levels for this purpose are disclosed herein. Using the two or more threshold levels as disclosed above enables more robust and less noise sensitive LEP identification. It also makes NSIP architectures more useful for identifying LEPs and of greater interest to use in practice. Embodiments herein thus provide improvements when it comes to identifying a pixel as a LEP using an NSIP based architecture. As a result, embodiments herein also, for example, enable improved sensors based on LEPs and NSIP, and enables improved results from LEP based algorithms implemented on NSIP architecture.

BRIEF DESCRIPTION OF THE DRAWINGS

Examples of embodiments herein are described in more detail with reference to the appended schematic drawings, which are briefly described in the following.

FIG. 4a is a block diagram schematically illustrating an NSIP architecture that may be used to implement an imaging and processing circuit according to embodiments herein.

FIGS. 4b-c are schematic diagrams for illustrating LEPs in a situation with binarized image data.

DETAILED DESCRIPTION

Figure 1:
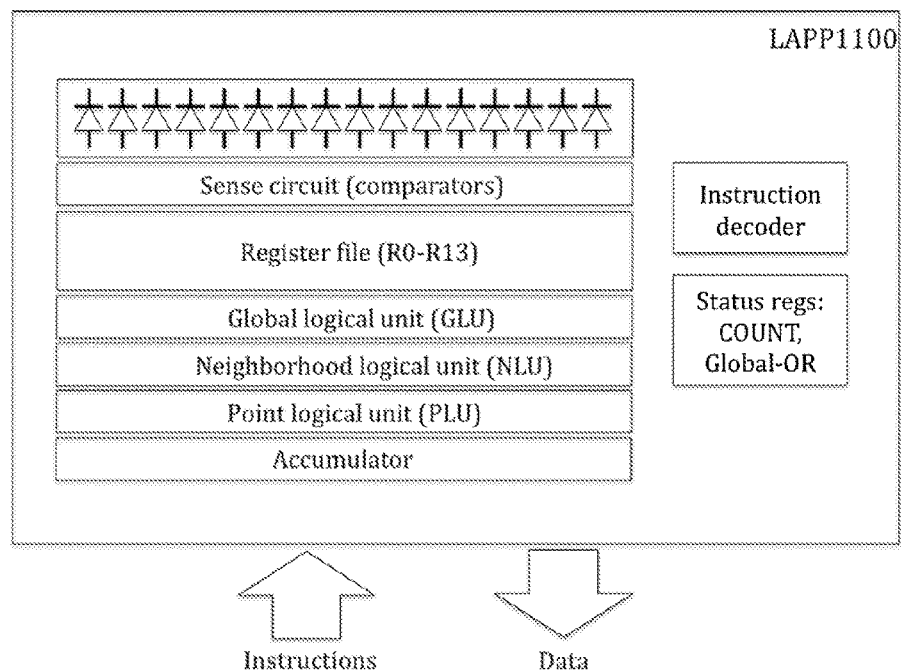
FIG. 1 is a schematic block diagram of an architecture of the LAPP1100, the first commercial implementation of the Near Sensor Image Processing (NSIP) concept.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As part of a development towards embodiments herein, the situation and problems indicated in the Background will first be further elaborated upon.

A conventional NSIP architecture as above with binarized image data is in general expected to be robust with regard to influence of noise. However, during experimentation and simulations relating to identifying LEPs using a conventional NSIP architecture, it turned out that when it is used for identifying LEPs and in particular sequences of consecutive LEPs, so called LEP runs, influence of noise may still degrade performance quickly, thereby making NSIP based solutions for finding LEPs of less interest than else could be the case. For example, as a result of noise, LEP runs break up and tend to be shorter than they should be, which e.g. negatively affects estimates based on LEP runs, e.g. resulting in too high estimates of speed.

Hence, if this negative influence of noise could be reduced there would be an improvement when it comes to identifying a pixel as a LEP using an NSIP based architecture.

FIG. 4 is a block diagram schematically illustrating an imaging and processing circuit 400 based on a NSIP architecture and that may be used for implementing embodiments herein.

The imaging and processing circuit 400 comprises an image sensing circuitry 410, that alternatively e.g. may be named an image sensor part or light sensing part, and a computing circuitry 420, that alternatively e.g. may be named a processing circuitry. The computing circuitry 420 is configured to operating on the output, i.e. image data, e.g. binarized image data, from the sensing circuitry 610, in particularly on local image data, such as on image data values of an individual pixel or a group of neighboring pixels.

The image sensing circuitry 410 comprises sensing elements 411 including e.g. including a sensing element $411_{1,1}$ indicated in the figure. Each sensing element, e.g. the sensing element $411_{1,1}$, provides binarized image data of a pixel in a corresponding position, i.e. pixel position, e.g. a pixel position $p_{1,1}$ for sensing element $411_{1,1}$, as shown in the figure. Another pixel position $p_{F,-2}$ is also marked in the figure just to illustrate the principle. Each of the sensing elements 411 of the image sensing circuitry 410, e.g. the sensing element $411_{1,1}$, may e.g. comprise or correspond to the light sensing parts a-f shown in FIG. 2. The sensing elements 411 in the figure are arranged in rows and columns. As illustrated, the sensing elements 411 may be arranged in F columns, F being an integer, and may thus may be numbered 1-F respectively. Further, the sensing elements 411, and thus also pixels respectively, may be arranged in 3 rows with a center row that may be numbered 0 and a preceding row to the center row that may be numbered −1 and a succeeding row that may be numbered +1. In some embodiments the sensing elements 411 are arranged in 5 rows, where the two additional rows may be numbered +2 and −2 respectively. Hence, a sensing element of the image sensing circuitry 410 may be referred to by its location or position by column and row. For example, the sensing element $411_{1,1}$ shown in the figure may be referred to as the sensing element in columns 1 and row 1 and may thus provide binarized image data of a pixel in pixel position $p_{1,1}$. Hence, a pixel in an image frame, which pixel is provided by a sensing element in a column x of the columns 1-F and is located in the center row 0, may be denoted by its position $p_{x,0}$.

In the shown architecture it may be advantageous if a LEP for a pixel is identified in relation to two or more of this pixel's closest neighboring pixels in the same column, i.e. that the pixel positions that a LEP is identified in relation to, are aligned with each other and with the pixel position of the LEP. Or in other words that the LEPs are identified in a certain direction that is exemplified in the figure. A LEP in this case may be identified by comparing binarized image data of a pixel position in the center row with binarized image data of the closest preceding and succeeding pixel positions in the same column. For example, a LEP in $p_{1,0}$ may be identified by comparing binarized image data of $p_{1,0}$ with binarized image data of $p_{1,1}$ and $p_{1,-1}$. Or in general, identifying whether there is a LEP or not in a pixel position $p_{x,0}$, where x may be any one of columns 1-F, may be done by comparing binarized image data of $p_{x,0}$ with binarized image data of $p_{x,-1}$ and $p_{x,1}$, and possibly also with binarized image data of $p_{x,-2}$ and $p_{x,2}$.

In general, the image sensing circuitry 410 may comprise a total number of F×H sensing elements 411, and thus pixels, where H denotes a number of rows and F the number of columns. This total number corresponds to a resolution of the image sensing circuitry 410. The sensing elements 411 may as shown be arranged in a matrix, i.e. F>1 and H>1, or in a line or single row, i.e. H=1, F>1. In case of a matrix, the image circuitry 610 may be referred to as a two dimensional, 2D, image sensor or 1.5D image sensor, where 1.5D may be used to indicate that the numbers of rows and columns differ to a greater extent than conventionally for a 2D image sensor, i.e. that F>>H. For embodiments herein it is preferred with 3 or 5 rows as illustrated in the figure and a number of columns F>>5. For example, the number of columns, i.e. F, can in practice be expected to be in the magnitude of 100 and e.g. in the range of 128 or 256.

The sensing elements 411, and thereby corresponding pixels, may be associated with a certain form factor. The form factor may be given by a ratio a/b, where a and b are indicated in the figure for one of the sensing elements 411. The ratio is thus 1 when there is a square shape.

The computing circuitry 420 comprises computing elements 421 including e.g. a computing element 421$_F$ indicated in the figure. The computing elements may alternatively be named pixel processors or bit processors and each computing element may e.g. comprise or correspond to the bit-serial arithmetic-logical unit g shown in FIG. 2.

Each of the computing elements 421, including the computing element 421$_F$, may be associated with, and be configured to operate on image data from, one and/or a group of the sensing elements 411 and thereby also be associated with corresponding one or more pixel positions, typically in a predetermined manner and/or e.g. determined by and according to a hardware architecture being used, e.g. according to a certain NSIP chip or circuitry being used. For example, in the shown figure, the computing element 421$_F$ may be configured to operate on image data from the sensing elements in the same column, in the shown example thus in column F. The computing elements 421 may be particularly associated with, e.g. integrated with, some sensing elements 411. In the figure the shown single row of computing elements may be particularly associated with sensing elements of the center pixel row, respectively, and may be named computing elements 411$_{1-F}$.

To sum up, the computing elements 421 may be integrated with the sensing elements 411 of the center row, thus forming center row elements, each center row element may comprise a photodiode, a comparator, a simple logic unit, and some memory. The sensing element adjacent to the center row, i.e. in rows −1, +1, and in some embodiments −2, +2, may in turn each comprise a photodiode and a comparator. The output, i.e. image data, from these adjacent pixels sensing elements are processed by the sensing elements of the center row, i.e. by the logical units of the center row, so that e.g. binarized image data, corresponding to a binary value or values, of pixel $p_{x,-1}$ and of pixel $p_{x,+1}$ are processed by the computing element in the same column x, i.e. corresponding to pixel position $p_{x,0}$ etc.

As should be understood, an image frame will in the context of the architecture shown in FIG. 4a correspond to a set of image data provided by the sensing elements 411 from one and the same exposure to light.

FIGS. 4b-c schematically illustrate how binarized image data for closest neighboring pixel positions $p_{x,-1}$, $p_{x,1}$ to a certain pixel position $p_{x,0}$ should be valued in order for binarized image data of said certain pixel position $p_{x,0}$ to be identified as a LEP. The figures show LEPs in the form of a local minima and local maxima, respectively.

Figure 5:
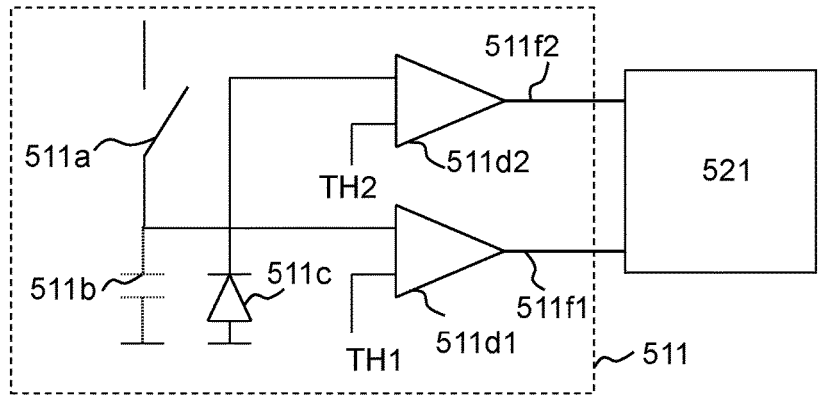
FIG. 5 schematically shows parts of a combined sensing element and computing element that may be used for implementation of some embodiments herein.

FIG. 5 shows schematic block diagram showing, in combination, a sensing element 511 and a computing element 521, that may be used for implementing some embodiments herein. The sensing element 511 may correspond to any of the sensing elements 411 in FIG. 4 and the computing element 521 may correspond to any of the computing elements 421 in FIG. 4. Further, the sensing element 511 may correspond to a light sensing part similar as in the LAPP1100, see e.g. a-f in FIG. 2, but extended with yet another, a second comparator 511d2 in addition to a first comparator 511d1. The comparators are associated with different threshold levels, respectively. The different threshold levels are denoted TH1 and TH2 in the figure. Any one or both of the threshold levels TH1 and TH2 can be set externally, i.e. may be configurable, e.g. by software executing on a device, e.g. a chip, comprising the computing element 521. One or both of the threshold levels may alternatively or additionally be predetermined and/or predefined.

Figure 2:
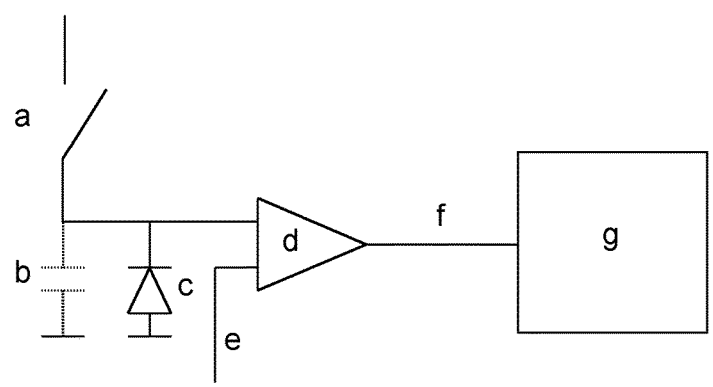
FIG. 2 schematically shows parts of a light sensing and processing element of the LAPP1100.
Figure 3:
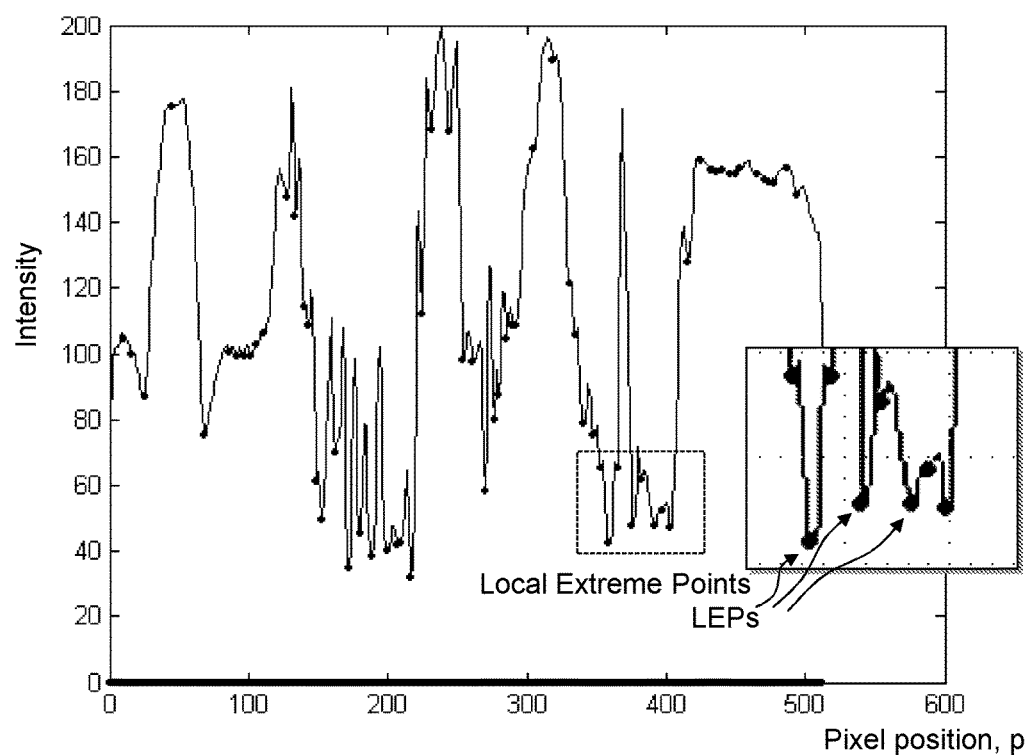
FIG. 3 is a diagram from a simulation just to illustrate Local Extreme Points (LEPs) in an image.

Similar as in the LAPP1100 case of FIG. 2, the shown sensing element 511 further comprises a photo diode 511c and a capacitor 511b representing an inherent capacitance of the photo diode 511c and a switch 511a. When the switch 511a is on, the photo diode 511c may pre-charge to its full value. As the switch is turned-off, the photo diode 511c may discharge due to photo-induced current, and voltages on the input of the comparators 511da and 511d2 decrease, respectively. At some level the voltage of comparator 511d1 may pass the threshold level TH1 and an output 511f1 of the comparator 511d1 switches its logical value corresponding to first binarized image data of a pixel. Similarly, at some level the voltage of comparator 511d2 may pass the threshold level TH2 and an output 511f2 of the comparator 511d2 switches its logical value corresponding to second binarized image data of the pixel.

The outputs, i.e. the binarized image data, here corresponding to two bits that may be of the same value or differ, owing to the two different threshold levels, may then be processed in the a computing element 521.

Typically it is desirable to keep the threshold level TH2 of the additional comparator, e.g. comparator 511d2, very close to the threshold level TH1 of the other, e.g. main, comparator 511d1, such within one or a few percent higher, e.g. about or 1% higher but this may depend on noise levels that needs to be handled, application area etc. A suitable difference can be found by routine experimentation.

An alternative to using an additional comparator but still be able to apply different threshold levels, is to use the same comparator twice with the same sensed levels at the photo diode, only changing the threshold level and perform another readout. This change of threshold value can and should be performed quickly compared to the discharge of the diodes, but it will still of course be possible to accomplish faster provision of binarized image data if it can be done in parallel, i.e. simultaneously, as with the solution shown in FIG. 5.

Table 1 below shows possible interpretation of states when two threshold levels, H and L, result in two outputs of binarized image data per pixel position, and when binarized image data of a pixel $p_{x,0}$ is to be compared with binarized image date of one of its closest neighboring pixels $p_{x,-1}$. A sensing element providing the binarized image data may e.g. be as shown in FIG. 5. The threshold H, e.g. TH1, may be a higher threshold than threshold L that may be a lower threshold, e.g. TH2. The skilled person realizes that Table 1 is relevant also when a LEP is to be identified since the only difference then is that comparison is also made with at least yet another closest neighboring pixel, $p_{x,+1}$. It is further realized that logical operations can be defined to find out which state is present.

TABLE 1

Possible interpretation of states when two threshold levels result in two outputs of binarized image data per pixel position

| $p_{x,0}$ H | $p_{x,0}$ L | $p_{x,-1}$ H | $p_{x,-1}$ L | Interpretation |
|---|---|---|---|---|
| 0 | 0 | 0 | 0 | No hit in either pixel |
| 0 | 0 | 1 | 0 | A brighter neighbor |
| 0 | 0 | 1 | 1 | A much brighter neighbor |
| 1 | 0 | 0 | 0 | Brighter than neighbor |
| 1 | 0 | 1 | 0 | Equal bright, little difference |
| 1 | 0 | 1 | 1 | Brighter neighbor |
| 1 | 1 | 0 | 0 | Much brighter than neighbor |
| 1 | 1 | 1 | 0 | Brighter than neighbor |
| 1 | 1 | 1 | 1 | Both bright |

Hence, thanks to the use of the two threshold levels, more information is available for decision making relevant for identifying a pixel as a LEP. This enables more robust LEP detection that is less sensitive to noise. The situation illustrated by Table 1 may be compared to a corresponding situation but where only with a single threshold is used per sensing element, i.e. as conventionally. See Table 2 below where the difference in interpretation relative to Table 1 has been marked up, with brackets indicating deletions and underlines indicating additions:

TABLE 2

Possible interpretation of states when a single threshold level result in a single output of binarized image data per pixel position.

| $p_{x,0}$ H | $p_{x,-1}$ H | Interpretation |
|---|---|---|
| 0 | 0 | No hit in either pixel |
| 0 | 1 | A brighter neighbor |
| 0 | 1 | A [much] brighter neighbor |
| 1 | 0 | Brighter than neighbor |
| 1 | 1 | Equal bright[, little difference] |
| 1 | 1 | [Brighter neighbor] Both bright |
| 1 | 0 | [Much] brighter than neighbor |
| 1 | 1 | [Brighter than neighbor] Both bright |
| 1 | 1 | Both bright |

In a conventional algorithm for LEP detection, e.g. for identifying a LEP in a pixel position $p_{x,0}$ if the architecture shown in FIG. 4 is used, the pixel is identified as a LEP when binarized image data of the pixel is a local maxima or minima in relation to binarized image data of its closest neighboring pixels in the same column, i.e. $p_{x,-1}$ and $p_{x,1}$. This condition for LEP detection can be described as:

$$LEP_{x,0} = (P_{x,0} > P_{x,-1}) \cap (P_{x,0} > P_{x,+1})$$

P here denotes binarized image data in a pixel position, for example, $P_{x,0}$ refers to binarized image data in pixel position $p_{x,0}$. The binarized image data has here been provided using one and the same threshold level for all involved pixel positions. Or in other words, the binarized image data for each involved pixel position may be output from a comparator that is using this threshold level.

In some embodiments, based on using different threshold levels as described above, the above condition is replaced with the following condition to thereby accomplish less sensitivity to noise:

$$LEP_{x,0} = (P_{x,0} > P_{x,-1}) \cap (P_{x,0} > P_{x,+1}) \cap (P_{x,0} > Q_{x,-2}) \cap (P_{x,0} > Q_{x,+2})$$

Here, P denotes binarized image data as above, e.g. output from a comparator that is using a first threshold level, e.g. TH1 as mentioned above. Q also denotes binarized image data in a pixel position but that has here been provided using another, advantageously higher, threshold level. For example, Q may be output from a comparator that is using another threshold level, e.g. TH2 as mentioned above, where TH2>TH1. For example, if TH1 is a reference voltage level $V_{ref}$, TH2 may be $V_{ref}*1.01$.

Figure 6:
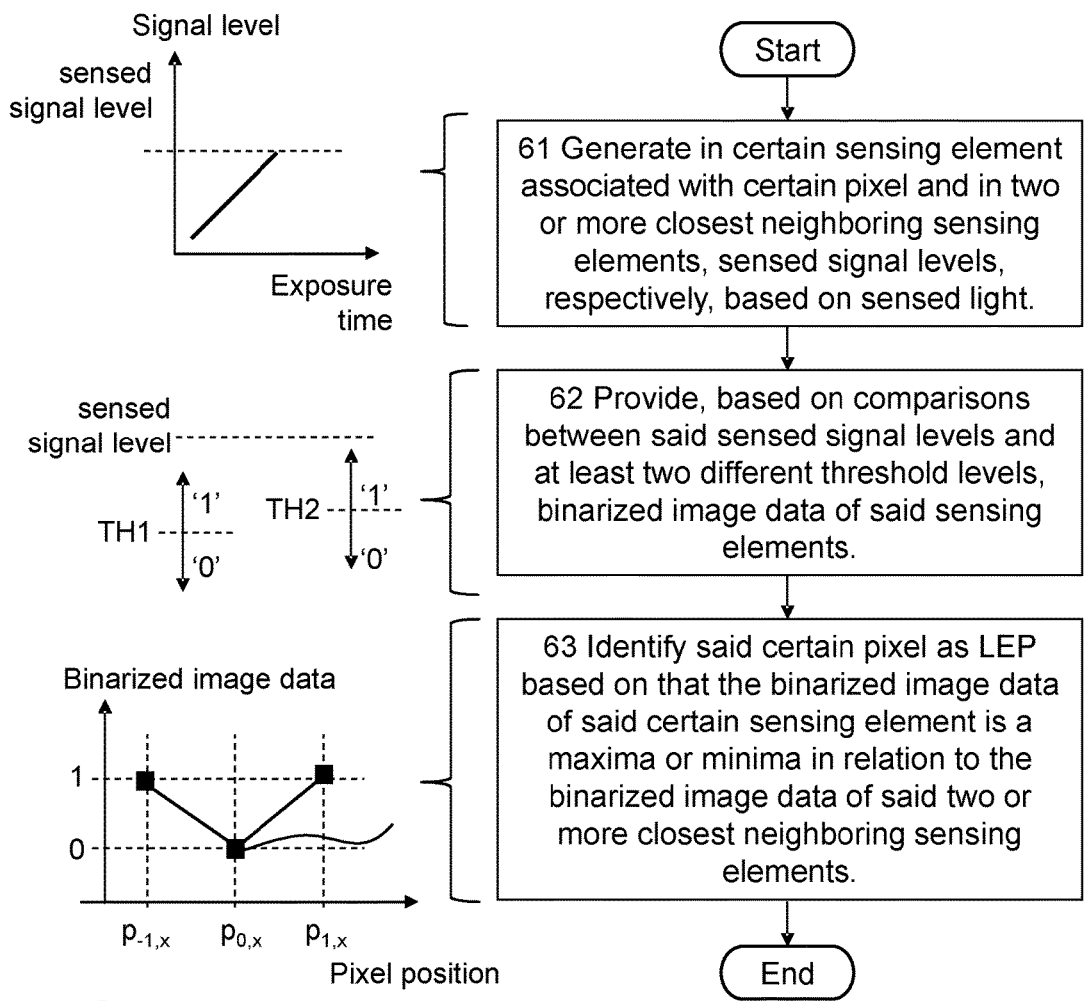
FIG. 6 is a flowchart schematically illustrating embodiments of a method according to embodiments herein.

FIG. 6 is a flowchart schematically illustrating embodiments of a method performed by an imaging and processing circuit that in the following will be exemplified by the imaging and processing circuit 400. The method is for identifying a certain pixel, e.g. a pixel in pixel position $p_{x,0}$, as a LEP.

The imaging and processing circuit 400 comprises multiple computing elements, e.g. the computing elements 421$_{A-F}$, and multiple sensing elements, e.g. the sensing elements 411$_{A-F,-1}$, 411$_{A-F,0}$, 411$_{A-F,1}$. The sensing elements 411$_{A-F,-1}$, 411$_{A-F,0}$, 411$_{A-F,1}$ are configured to sense light and in response provide binarized image data of pixels, respectively. The computing elements 421$_{A-F}$ are configured to operate on binarized image data from different subsets, respectively, of said sensing elements. Each subset comprises a sensing element, e.g. the sensing element 411$_{x,0}$, and at least two closest neighboring sensing elements thereof, e.g. the sensing elements 411$_{x,-1}$, 411$_{x,1}$.

The method comprises the following actions, which actions may be taken in any suitable order and/or be carried out fully or partly overlapping in time when this is possible and suitable. Note that the schematic illustrations to the left of some action boxes in the flowchart are merely simplified examples that have been added to just to facilitate understanding, but are not in any way to be considered as limiting what is stated in the actions below.

Action 61

The imaging and processing circuit 400 generates, in a certain sensing element, e.g. the sensing element 411$_{x,0}$, associated with said certain pixel and in two or more of its closest neighboring sensing elements, e.g. the sensing elements 411$_{x,-1}$, 411$_{x,1}$, sensed signal levels, respectively. The sensed signal levels are based on sensed light during an exposure to light.

Action 62

The imaging and processing circuit 400 provides, based on comparisons between said sensed signal levels and at least two different threshold levels, binarized image data of said certain sensing element, e.g. the sensing element $411_{x,0}$, and said two or more of its closest neighboring sensing elements, i.e. for example sensing elements $411_{x,-1}$, $411_{x,1}$. Said certain sensing element and said two or more of its closest neighboring sensing elements may be aligned with each other, such as by being comprised in the same column as is the case for said sensing elements $411_{x,0}$, $411_{x,-1}$, $411_{x,1}$. The LEP will in this case be identified in a certain direction according to the alignment. Said at least two different threshold levels may be threshold levels as described above, e.g. TH1 and TH2.

In some embodiments, said at least two different threshold levels are associated with comparators, e.g. the comparators 511d1, 511d2, respectively. That is, there may be one comparator per threshold level. The comparators may be comprised in each of the sensing elements $411_{x,0}$, $411_{x,-1}$, $411_{x,1}$ and configured to provide the binarized image data. In some further embodiments, said comparators 511d1, 511d2 are configured to separately provide the binarized image data, thereby providing, per sensing element, one bit of binarized image data per comparator.

Moreover, in some embodiments, the binarized image data of at least one of said certain sensing element and said two or more of its closest neighboring sensing elements, e.g. of at least one of the sensing elements $411_{x,0}$, $411_{x,-1}$, $411_{x,1}$, is provided at least twice. Each time based on a different one of said at least two different threshold levels. This may be an alternative to more than one comparator per sensing element and still be able to provide the binarized image data using at least two different threshold levels.

Furthermore, in some embodiments, a threshold level of said at least two different threshold levels, used for the comparison in said certain sensing element, i.e. for example sensing element $411_{x,0}$, is different than another threshold level of said at least two different threshold levels, used for the comparison in the closest preceding and closest subsequent sensing elements, e.g. the sensing elements $411_{x,-1}$, $411_{x,1}$.

Also, in some embodiments, said two or more of closest neighboring sensing elements comprise the closest preceding and closest subsequent sensing elements, e.g. the sensing elements $411_{x,-1}$, $411_{x,1}$, and also the second closest preceding and second closest subsequent sensing elements, e.g. the sensing elements $411_{x,-2}$, $411_{x,2}$. Robustness to noise can be increased by including also the second closest neighbors. In these embodiments it is advantageous if a threshold level of said at least two different threshold levels, used for the comparison in the closest preceding and closest subsequent sensing elements, e.g. the sensing elements $411_{x,-1}$, $411_{x,1}$, is different than another threshold level of said at least two different threshold levels, used for the comparison in the second closest preceding and second closest subsequent pixel sensing elements, e.g. the sensing elements $411_{x,-2}$, $411_{x,2}$.

Action 63

The imaging and processing circuit 400 identifies said certain pixel as the LEP by means of a computing element, e.g. the computing element $421_x$, configured to operate on the provided binarized image data. Said certain pixel being identified as the LEP based on that the provided binarized image data of said certain sensing element $411_{x,0}$ differ from the provided binarized image data of said two or more of its closest neighboring sensing elements, i.e. sensing elements $411_{x,-1}$, $411_{x,1}$. The difference indicating that there is a local maxima or minima in said certain pixel.

Embodiments herein is about identifying a pixel as a LEP using an NSIP based architecture, and relate to different ways of utilizing two or more threshold levels when providing binarized image data that the identification is based on, thereby enabling more robust and less noise sensitive LEP identification. This makes NSIP architectures more useful for identifying LEPs and of greater interest to use in practice. Embodiments herein thus provide improvements when it comes to identifying a pixel as a LEP using an NSIP based architecture.

As a result, embodiments herein also, for example, enable improved sensors based on LEPs and NSIP, and enables improved results from LEP based algorithms implemented on NSIP architecture.

Figure 7:
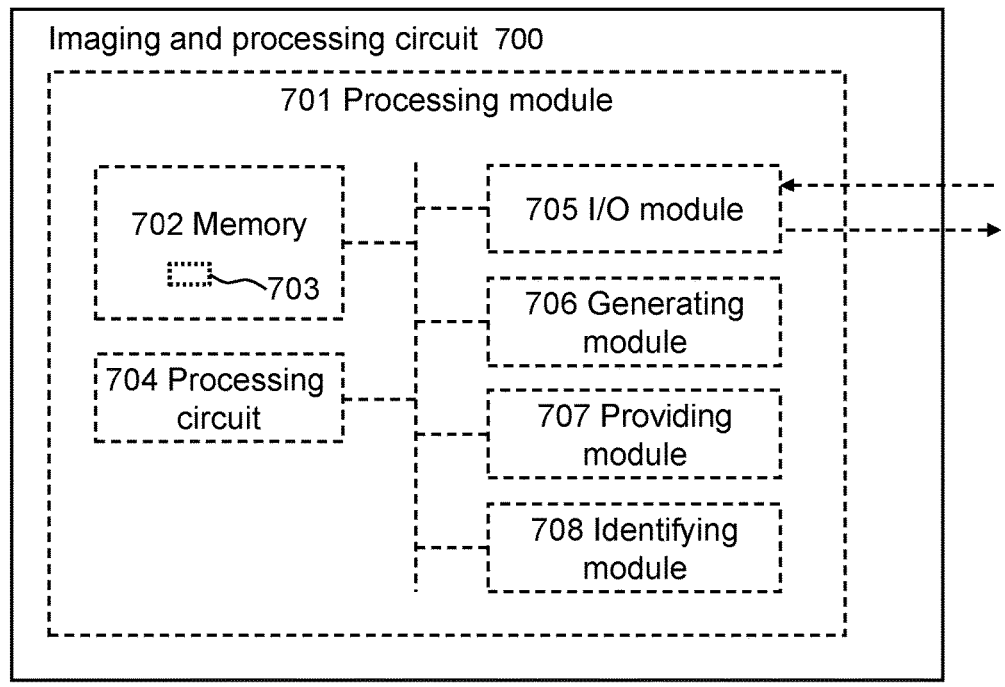
FIG. 7 is a functional block diagram for illustrating embodiments of an imaging and processing circuit according to embodiments herein and how it can be configured to carry out the method.

FIG. 7 is a schematic block diagram for illustrating embodiments of how an imaging and processing circuit 700 that e.g. may correspond to the imaging and processing circuit 400, may be configured to perform the method and actions discussed above in connection with FIG. 6.

Hence, the imaging and processing circuit 700 is for identifying said certain pixel as said local extreme point.

The imaging and processing circuit 700 may comprise a processing module 701, such as a means, one or more hardware modules, including e.g. one or more processors, and/or one or more software modules for performing said methods and/or actions. The processing module 701 may comprise the computing circuitry 420 and may also comprise the image sensing circuitry 410.

The imaging and processing circuit 700 may further comprise a memory 702 that may comprise, such as contain or store, a computer program 703. The computer program 703 comprises 'instructions' or 'code' directly or indirectly executable by the motion encoder 700 so that it performs said methods and/or actions. The memory 702 may comprise one or more memory units and may further be arranged to store data, such as configurations and/or applications involved in or for performing functions and actions of embodiments herein.

Moreover, the imaging and processing circuit 700 may comprise a processing circuit 704 as an exemplifying hardware module and may comprise or correspond to one or more processors. The processing circuit 704 may in some embodiments fully or partly correspond to the computing circuitry 420. In some embodiments, the processing module 701 may comprise, e.g. 'is embodied in the form of' or 'realized by', at least partly, the processing circuit 704. In these embodiments, the memory 702 may comprise the computer program 703 executable by the processing circuit 704, whereby the imaging and processing circuit 700 is operative, or configured, to perform said method and/or actions thereof.

Typically the imaging and processing circuit 700, e.g. the processing module 701, comprises an Input/Output (I/O) module 705, configured to be involved in, e.g. by performing, any communication to and/or from other units and/or devices, such as sending and/or receiving information to and/or from these other units and/or devices. The I/O module 705 may be exemplified by an obtaining, e.g. receiving, module and/or a providing, e.g. sending, module, when applicable.

Further, in some embodiments, the imaging and processing circuit 700, e.g. the processing module 701, comprises one or more of a generating module 706, a providing module 707 and an identifying module 708 as exemplifying hardware and/or software module(s). These modules may be fully or partly implemented by the processing circuit 704.

The imaging and processing circuit 700 comprises multiple computing elements, e.g. the computing elements $421_{A\text{-}F}$ and multiple sensing elements, e.g. the sensing elements $411_{A\text{-}F,-1}$, $411_{A\text{-}F,0}$, $411_{A\text{-}F,1}$. The sensing elements are not specifically indicated in FIG. 7 but may e.g. be comprised outside or in the processing module 701 and/or in the generating module 706 and/or in the providing module 707. Also the computing elements are not specifically indicated in FIG. 7 but may e.g. be comprised in the processing module 701 and/or the processing circuit 704 and/or the identifying module 708.

As already mentioned above, the sensing elements are configured to sense light and in response provide binarized image data of pixels, respectively. The computing elements are configured to operate on binarized image data from different subsets, respectively, of said sensing elements, each subset comprising a sensing element and at least two closest neighboring sensing elements thereof.

Hence, the imaging and processing circuit 700, and/or the processing module 701, and/or the processing circuit 704, and/or, the generating module 706 are operative, or configured, to generate, in said certain sensing element associated with said certain pixel and in said two or more of its closest neighboring sensing elements, the sensed signal levels, respectively.

Further, the imaging and processing circuit 700, and/or the processing module 701, and/or the processing circuit 704, and/or the providing module 707 are operative, or configured, to provide, based on said comparisons between said sensed signal levels and said at least two different threshold levels, the binarized image data of said certain sensing element and said two or more of its closest neighboring sensing elements.

Moreover, the imaging and processing circuit 700, and/or the processing module 701, and/or the processing circuit 704, and/or the identifying module 708 are operative, or configured, to identify, by means of said computing element configured to operate on the provided binarized image data, said certain pixel as the local extreme point based on that the provided binarized image data of said certain sensing element differ from the provided binarized image data of said two or more of its closest neighboring sensing elements.

Figure 8A:
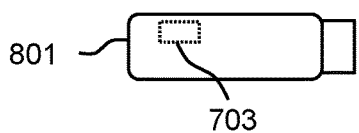
FIGS. 8a-c are schematic drawings illustrating embodiments relating to computer program products and a computer program to cause the imaging and processing circuit to perform said method.
Figure 8B:
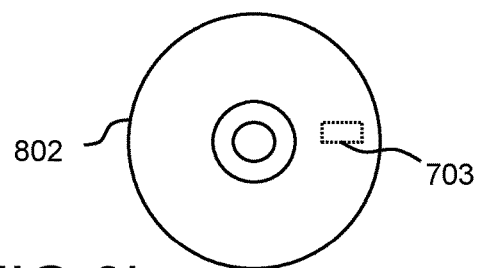
Figure 8C:
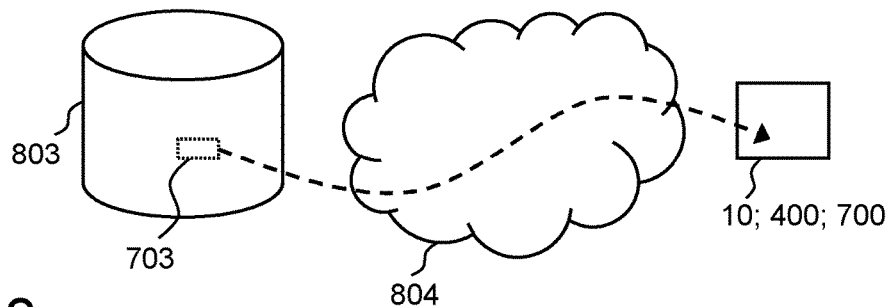

FIGS. 8*a-c* are schematic drawings illustrating embodiments relating to a computer program that may be the computer program 703 and that comprises instructions that when executed by the processing circuit 704 and/or the processing modules 701 causes the imaging and processing circuit 700 to perform as described above.

In some embodiments there is provided a carrier, such as a data carrier, e.g. a computer program product, comprising the computer program 703. The carrier may be one of an electronic signal, an optical signal, a radio signal, and a computer readable medium. The computer program 703 may thus be stored on the computer readable medium. By carrier may be excluded a transitory, propagating signal and the carrier may correspondingly be named non-transitory carrier. Non-limiting examples of the carrier being a computer-readable medium is a memory card or a memory stick 801 as in FIG. 8*a*, a disc storage medium 802 such as a CD or DVD as in FIG. 8*b*, a mass storage device 803 as in FIG. 8*c*. The mass storage device 803 is typically based on hard drive(s) or Solid State Drive(s) (SSD). The mass storage device 803 may be such that is used for storing data accessible over a computer network 804, e.g. the Internet or a Local Area Network (LAN).

The computer program 703 may furthermore be provided as a pure computer program or comprised in a file or files. The file or files may be stored on the computer-readable medium and e.g. available through download e.g. over the computer network 804, such as from the mass storage device 803 via a server. The server may e.g. be a web or File Transfer Protocol (FTP) server. The file or files may e.g. be executable files for direct or indirect download to and execution on the imaging and processing circuit 700, to perform as described above, e.g. by the processing circuit 704. The file or files may also or alternatively be for intermediate download and compilation involving the same or another processor to make them executable before further download and execution causing the imaging and processing circuit 700 to perform as described above.

Note that any processing module(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC). The imaging and processing circuit of embodiments herein is preferably implemented on an NSIP architecture, e.g. on a chip implementation of a NSIP type of processor, such as the LAPP1100 chip or similar. Some embodiments herein may be realized by programming, such as by installing the computer program 703, on an NSIP chip.

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors make the imaging and processing circuit according to embodiments herein to be configured to and/or to perform the above-described actions of embodiments herein.

Note that in case it is possible and/or suitable, one or more embodiments herein, e.g. relating to one or more methods and/or entities, can be implemented in one and the same physical arrangement or entity.

As used herein, the term "unit" may refer to one or more functional units, each of which may be implemented as one or more hardware modules and/or one or more software modules in a node.

As an example, the expression "means" may be a module corresponding to the modules listed above in conjunction with the figures.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology used herein, such as first method, second method, and first arrangement, second arrangement, etc., and the like, as may be used herein, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit, a bit string or word.

As used herein, the expression "in some embodiments" has been used to indicate that the features of the embodiment described may be combined with any other embodiment disclosed herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by an imaging and processing circuit, for identifying a certain pixel as a local extreme point, wherein said imaging and processing circuit comprises multiple computing elements and multiple sensing elements, the sensing elements being configured to sense light and in response provide binarized image data of pixels, respectively, the computing elements being configured to operate on binarized image data from different subsets, respectively, of said sensing elements, each subset comprising a sensing element and at least two closest neighboring sensing elements thereof, wherein the method comprises:
   generating, in a certain sensing element associated with said certain pixel and in two or more of its closest neighboring sensing elements, sensed signal levels, respectively, based on sensed light during an exposure to light,
   providing, based on comparisons between said sensed signal levels and at least two different threshold levels, binarized image data of said certain sensing element and said two or more of its closest neighboring sensing elements, and
   identifying, by means of a computing element configured to operate on the provided binarized image data, said certain pixel as the local extreme point based on that the provided binarized image data of said certain sensing element differ from the provided binarized image data of said two or more of its closest neighboring sensing elements, the difference indicating that there is a local maxima or minima in said certain pixel.

2. The method as claimed in claim 1, wherein said at least two different threshold levels are associated with comparators, respectively, comprised in each sensing element and configured to provide the binarized image data.

3. The method as claimed in claim 2, wherein said comparators are configured to separately provide the binarized image data, thereby providing, per sensing element, one bit of binarized image data per comparator.

4. The method as claimed in claim 1, wherein the binarized image data of at least one of said certain sensing element and said two or more of its closest neighboring sensing elements is provided at least twice, each time based on a different one of said at least two different threshold levels.

5. The method as claimed in claim 1, wherein said certain sensing element and said two or more of its closest neighboring sensing elements are aligned with each other.

6. A computer program comprising instructions that when executed by an imaging and processing circuit causes the an imaging and processing circuit to perform the method according to claim 1.

7. An imaging and processing circuit for identifying a certain pixel as a local extreme point, wherein said imaging and processing circuit comprises multiple computing elements and multiple sensing elements, the sensing elements being configured to sense light and in response provide binarized image data of pixels, respectively, the computing elements being configured to operate on binarized image data from different subsets, respectively, of said sensing elements, each subset comprising a sensing element and at least two closest neighboring sensing elements thereof, wherein the imaging and processing circuit is configured to:
   generate, in a certain sensing element associated with said certain pixel and in two or more of its closest neighboring sensing elements, sensed signal levels, respectively, based on sensed light during an exposure to light,
   provide, based on comparisons between said sensed signal levels and at least two different threshold levels, binarized image data of said certain sensing element and said two or more of its closest neighboring sensing elements, and
   identify, by means of a computing element configured to operate on the provided binarized image data, said certain pixel as the local extreme point based on that the provided binarized image data of said certain sensing element differ from the provided binarized image data of said two or more of its closest neighboring sensing elements, the difference indicating that there is a local maxima or minima in said certain pixel.

8. The imaging and processing circuit as claimed in claim 7, wherein said at least two different threshold levels are associated with comparators, respectively, comprised in each sensing element and configured to provide the binarized image data.

9. A carrier comprising the computer program according to claim 8.

10. The imaging and processing circuit as claimed in claim 8, wherein said comparators are configured to separately provide the binarized image data, thereby providing, per sensing element, one bit of binarized image data per comparator.

11. The imaging and processing circuit as claimed in claim 7, wherein the binarized image data of at least one of said certain sensing element and said two or more of its closest neighboring sensing elements is provided at least twice, each time based on a different one of said at least two different threshold levels.

12. The imaging and processing circuit as claimed in claim 7, wherein said certain sensing element and said two or more of its closest neighboring sensing elements are aligned with each other.

13. The imaging and processing circuit as claimed in claim 7, wherein a threshold level of said at least two different threshold levels, used for the comparison in said certain sensing element is different than another threshold level of said at least two different threshold levels, used for the comparison in the closest preceding and closest subsequent sensing elements.

14. The imaging and processing circuit as claimed in claim 7, wherein said two or more of its closest neighboring sensing elements comprise the closest preceding and closest subsequent sensing elements and the second closest preceding and second closest subsequent sensing elements.

15. The imaging and processing circuit as claimed in claim 14, wherein a threshold level of said at least two different threshold levels, used for the comparison in the closest preceding and closest subsequent sensing elements, is different than another threshold level of said at least two different threshold levels, used for the comparison in the second closest preceding and second closest subsequent pixel sensing elements.

* * * * *